United States Patent
Van Asten et al.

(10) Patent No.: US 7,657,159 B2
(45) Date of Patent: Feb. 2, 2010

(54) SLIDE SHOW GENERATION ON DVD-VIDEO COMPATIBLE DISCS INCLUDING DVD+RW AND DVD+R

(75) Inventors: Petrus Jacobus Hubertus Johannes Van Asten, Eindhoven (NL); Paulus Thomas Arnoldus Thijssen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 661 days.

(21) Appl. No.: 10/570,213

(22) PCT Filed: Aug. 23, 2004

(86) PCT No.: PCT/IB2004/002759

§ 371 (c)(1),
(2), (4) Date: Feb. 28, 2006

(87) PCT Pub. No.: WO2005/022531

PCT Pub. Date: Mar. 10, 2005

(65) Prior Publication Data

US 2006/0284885 A1    Dec. 21, 2006

(30) Foreign Application Priority Data

Sep. 3, 2003    (EP) .................................. 03300107

(51) Int. Cl.
*H04N 5/00* (2006.01)
*H04N 7/26* (2006.01)

(52) U.S. Cl. ....................................... 386/125; 386/124

(58) Field of Classification Search .................. 386/46, 386/107, 117, 120, 125, 124
See application file for complete search history.

(56) References Cited

U.S. PATENT DOCUMENTS

| 2002/0168179 A1* | 11/2002 | Kikuchi et al. ................. 386/97 |
| 2003/0052897 A1 | 3/2003 | Lin |
| 2004/0105661 A1 | 6/2004 | Seo et al. |

FOREIGN PATENT DOCUMENTS

| EP | 0866461 A2 | 9/1998 |
| EP | 1276108 A2 | 1/2003 |
| JP | 2003333508 | 11/2003 |

(Continued)

OTHER PUBLICATIONS

"Creating a Slideshow From a Series of Still Images" http://helpqu.apple.com/qthelpcr1/english/QuickTimeHelp/pgs/27.thm, Jul. 11, 2003.

(Continued)

*Primary Examiner*—Robert Chevalier

(57) ABSTRACT

A method and a device generate a DVD-Video compatible data structure from still pictures so as to create a slide show, where the data structure is compatible with the DVD+RW and DVD+R specifications. In one embodiment, a set of $N_i$ video object units (VOBUs) is generated for each still picture, where each of the VOBUs include one video picture derived from the original still picture and a video gap. The video pictures of the $N_i$ VOBUs only differ by their time stamps. Consequently, the DVD-Video compatible data structure is easy and fast to author. The DVD-Video compatible data structure has a low bitrate, and the presentation time of each picture can be adapted by setting the number $N_i$ and/or the length of the video gap.

17 Claims, 3 Drawing Sheets

FOREIGN PATENT DOCUMENTS

| | | |
|---|---|---|
| JP | 2003259303 | 12/2003 |
| WO | 2004047106 A1 | 6/2004 |

OTHER PUBLICATIONS

"Q & A: Can I Put Digital Pictures on DVD?" Http://www.pcworld.com/howto/article/0,aid,109178,pg,3,00.asp, Jul. 11, 2003.

"Sonic Solutions My DVD 4" http://www.corporatemedianews.com/2002/12_dec/reviews/mydvd41209.htm, Jul. 14, 2003.

"Slideshow Software" http://www.imagematics.com/PE/Products/PE_Product_Page.htm, Jul. 11, 2003.

ISR: PCT/IB04/002759, Jan. 2004.

Written Opinion: PCT/IB04/002759, Jan. 2004.

\* cited by examiner

SLIDE SHOW GENERATION ON DVD-VIDEO COMPATIBLE DISCS INCLUDING DVD+RW AND DVD+R

FIELD OF THE INVENTION

The invention relates to a device, a method and a computer program for generating a DVD-Video compatible data structure from at least a plurality of still pictures. The invention also relates to a device and a method for recording such a DVD-Video compatible data structure on a recordable DVD-Video compatible medium. The invention also relates to a DVD-Video compatible medium carrying such a DVD-Video compatible data structure.

Several formats are currently available that are compatible with the DVD-Video specification. DVDs that can be recorded only once are referred to by the acronym DVD-R or DVD+R. DVDs that are rewritable (that is DVDs that can be recorded, erased and re-recorded, or overwritten) are referred to by the acronyms DVD-RAM, DVD-RW and DVD+RW. The invention is of particular interest for the DVD+RW and DVD+R formats.

BACKGROUND OF THE INVENTION

US patent application no 2003/0052897 describes a method and a device for generating a data structure from at least a plurality of still pictures, said data structure being backward compatible with the DVD-Video standard, and for recording said data structure on a recordable DVD medium.

US2003/0052897 introduces the concept of Picture Unit (PU). This concept is an add-on to the DVD-Video format for the purpose of providing direct picture access. According to US2003/0052897, the Cells of the DVD-Video data structure are divided into so-called "Picture Units" where each Picture Unit contains at least one Video Object Unit (VOBU) containing Video Data representing a photograph. The "Picture Unit" may comprise additional VOBUs containing audio, video or subtitle information that have been combined with said photograph. According to US2003/0052897, the time allotted for displaying a picture is set by adding non-conventional data to the Navigation Pack (NV_PCK) of the Picture Unit (a PU display time parameter and a slide show display time parameter).

These settings can only be used by players that are PU aware, not the conventional players.

According to the DVD-Video specification (paragraph 5.1.1), a VOBU (except the last VOBU of a Cell) represents a presentation period of at least 0.4 second and at most 1.0 second, and the last VOBU of a Cell represents a presentation period of at least 0.4 second and at most 1.2 seconds. With the solution described in US2003/0052897, if conventional players are used, the display duration of a photograph will be limited to the presentation period of the VOBU containing the video data that represent said photograph (except if it is combined with additional VOBUs containing non-video data like audio data). A presentation period of 1 second will generally be regarded as too short for a slide show.

OBJECT AND SUMMARY OF THE INVENTION

It is an object of the invention to provide a solution for setting the time allotted for the display of the pictures to a value that is appropriate for a slide show, said solution being usable by any DVD-Video compatible player.

It is another object of the invention to provide a solution for generating a DVD-Video compatible data structure from at least a plurality of still pictures so as to create a slide show, said data structure being compatible with the DVD+RW specification.

According to the invention, a DVD-Video compatible data structure is generated from at least a plurality of still pictures, by:

reading said still pictures, processing said still pictures to generate video pictures having a DVD-Video compatible format, said video pictures comprising time stamps, generating from each video picture a set of Video Object Units wherein each Video Object Unit comprises said video picture with different time stamps and a video gap, generating a DVD-Video compatible data structure comprising said sets of Video Object Units.

With the proposed data structure, the display duration of a picture is the sum of the presentation periods of all the VOBUs of the set of VOBUs that was generated from the original still picture. It depends on the presentation period of each VOBU (i.e. on the quantity of video gap), and on the number of VOBUs. Therefore, any display duration higher than or equal to 0.4 second can be set in principle.

In the proposed data structure, each still picture needs to be encoded only once. The only processing needed to generate the various VOBUs of each set of VOBUs is an adaptation of the time stamps of the video picture (the Decoding Time Stamp and the Presentation Time Stamp defined in the MPEG specifications). Consequently the proposed data structure is very easy and fast to author.

Another advantage of the proposed data structure is that the resulting bitrate is relatively low since each VOBU comprises only one video picture.

Since each VOBU contains a video picture, the proposed data structure is compatible with the DVD+RW specification (paragraph 1.5.32 of the DVD+RW Video specification states that a VOBU shall contain at least one video frame).

Advantageously the quantity of video gap and/or the number of VOBUs is adaptable. For example, it may be adaptable on a picture by picture basis. It may also be user adaptable.

BRIEF DESCRIPTION OF THE DRAWINGS

These and other aspects of the invention are further described by reference to the following Figures.

DESCRIPTION OF EMBODIMENTS

Figure 1:
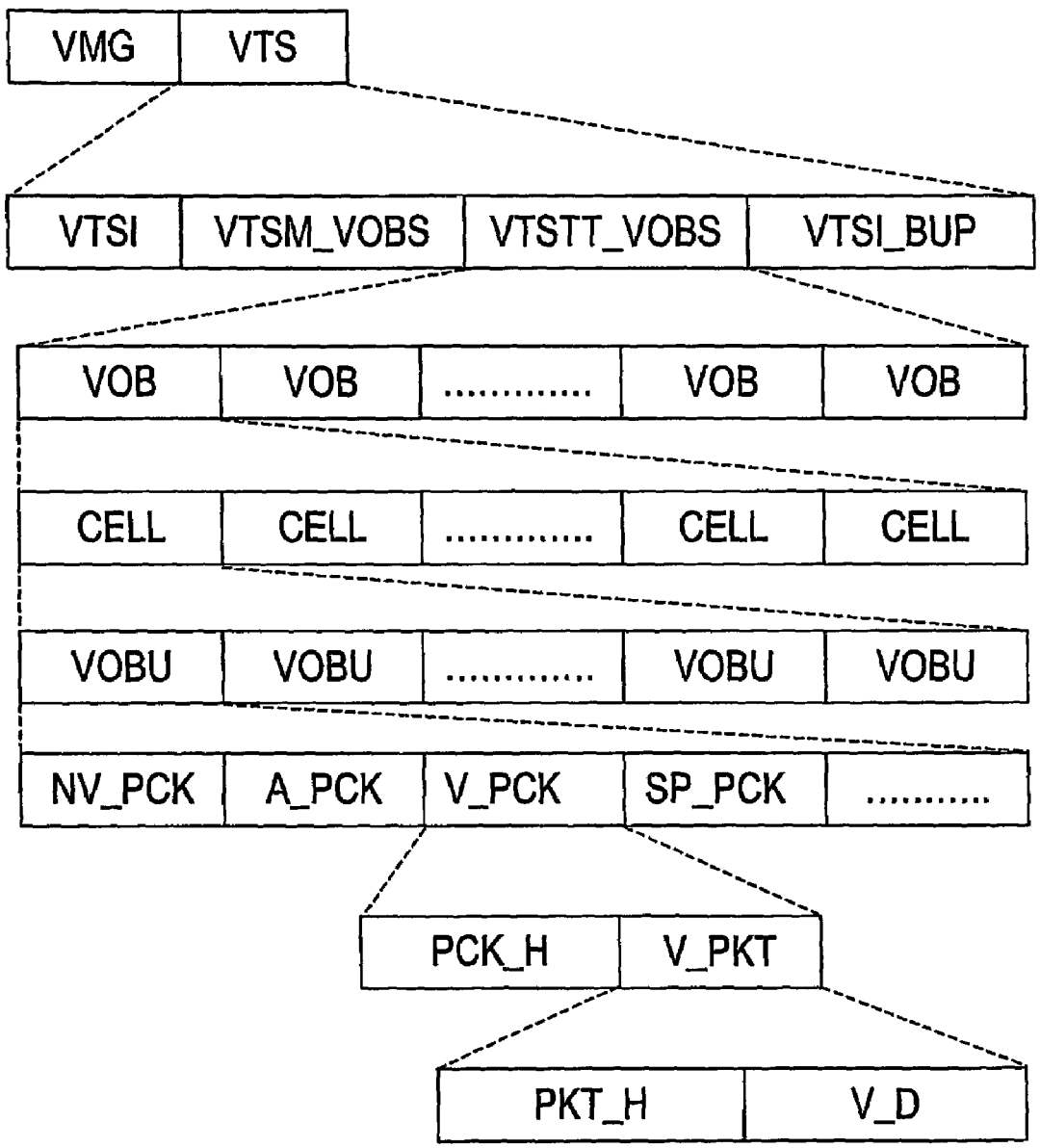
FIG. 1 is a schematic representation of a DVD-Video compatible data structure.

FIG. 1 gives a schematic representation of the data structure of a DVD-Video disc. As represented in FIG. 1, the data structure of a DVD-Video disc comprises a Video Manager VMG and a Video Title Set VTS. The Video Title Set VTS comprises control data referred to as Video Title Set Information VTSI, a Video Object Set for the Video Title Set Menu VTSM_VOBS, a Video Object Set for Titles in the Video Title Set VTSTT_VOBS, and Backup Control Data VTSI_BUP. The Video Object Set for Titles in the Video Title Set VTSTT_VOBS comprises a plurality of Video Objects VOB. The Video Objects comprise a plurality of Cells CELL. The Cells CELL comprise a plurality of Video Object Units VOBU. The Video Object Units VOBU start with one Navigation Pack NV_PCK and encompasses the following types of packs, if any, in any order: Video Packs V_PCK, Audio Packs A_PCK, and Sub-picture Packs SP_PCK. The Video Packs comprise a Pack Header PCK_H and a Video Packet V_PKT. The Video Packet V_PKT comprises a Packet header PKT_H and Video Data V_D.

The Video Data of one VOBU can be divided over the payload of several Video Packs V_PCK and Video Packets V_PKT.

The method and the device of the invention are designed to generate a data structure of the type described with reference to FIG. 1 from a plurality of still pictures. Other types of material like video, audio, or subtitles may be included into said data structure.

Typically the still pictures are pictures captured with a digital camera. This is not restrictive: the invention applies to any type of digital pictures including synthesized pictures and traditional photographs previously scanned and digitized. Examples of common formats for digital pictures are the EXIF format, the GIF format, and the JPEG format.

Figure 2:
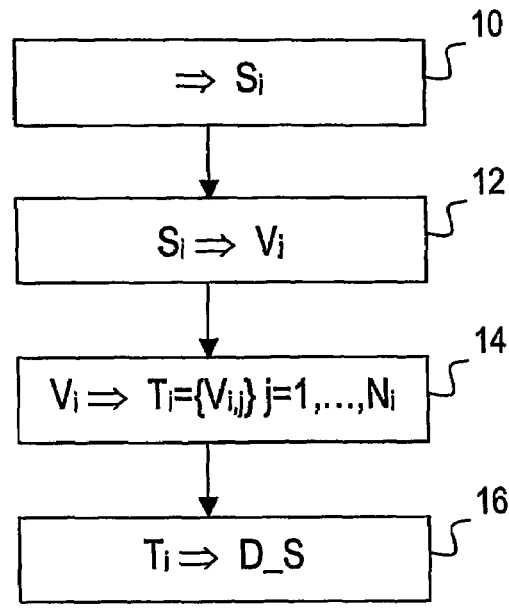
FIG. 2 is a block diagram of a method according to the invention of generating a DVD-Video compatible data structure from at least a plurality of still pictures.

As represented in FIG. 2, a method according to the invention of generating such a data structure comprises:

a step 10 of reading still pictures $S_i$ (i=1, . . . , Q) that are to be included into the data structure;

a step 12 of processing each of said still pictures $S_i$ to generate a video picture $V_i$ having a DVD-Video compatible format, i.e. the MPEG-1 or the MPEG-2 format; according to the MPEG specifications, each video picture has a Decoding Time Stamp and a Presentation Time Stamp. The Decoding Time Stamp is the time at which the video picture is to be decoded, and the Presentation Time Stamp is the time at which the video picture is to be displayed;

a step 14 of generating from each video picture $V_i$ a set $T_i$ of $N_i$ Video Object Units wherein each Video Object Unit $VOBU_{i,j}$ (j=1, . . . , $N_i$) comprises a video picture $V_{i,j}$ and a video gap;

a step 16 of generating a DVD-Video compatible data structure D_S comprising said sets $T_i$ (i=1, . . . , Q) of Video Object Units.

The processing step 12 transcodes the pictures from a still picture format (for example EXIF, JPEG or GIF) into the MPEG-1 or MPEG-2 format.

The video pictures $V_{i,j}$ (j=1, . . . , $N_i$) are identical to the video picture $V_i$ except for their Decoding Time Stamps $DTS_{i,j}$ and Presentation Time Stamps $PTS_{i,j}$. The video pictures $V_{i,j}$ (j=1, . . . , $N_i$) have different time stamps. The Decoding Time Stamps $DTS_{i,j}$ and the Presentation Time Stamps $PTS_{i,j}$ are such that: $DTS_{i,j} < DTS_{i,j+1}$ and $PTS_{i,j} < PTS_{i,j+1}$.

Advantageously, a set $T_i$ of Video Object Units $VOBU_{i,j}$ is generated by creating a first Video Object Unit $VOBU_{i,1}$, repeating this first Video Object Unit and adapting the time stamps $DTS_{i,j}$ and $TPS_{i,j}$.

As already mentioned, a Video Object Unit (except for the last Video Object Unit of a Cell) has a presentation period comprised between 0.4 second and 1.0 second (the last Video Object Unit of a Cell having a presentation period comprised between 0.4 second and 1.2 seconds). The video gap in each Video Object Unit $VOBU_{i,j}$ is created by setting a presentation period for the Video Object Unit $VOBU_{i,j}$ that is longer than the presentation period of the video picture $V_{i,j}$. The presentation period of a video picture $V_{i,j}$ depends on the rate at which the video pictures are generated. Typically an MPEG encoder generates video pictures at a rate of 25 Hz (PAL/SECAM video format) or 29,97 Hz (NTSC video format). According to the DVD-Video specification (paragraph 5.1.1), if the presentation period of a Video Object Unit is longer than the presentation period of the video it contains, then the last coded picture shall be followed by a sequence_end_code.

Figure 3:
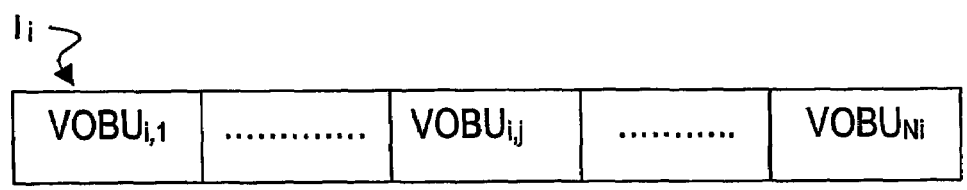
FIG. 3 is a schematic representation of a set of Video Object Units generated from one still picture by applying the method described with reference to FIG. 2.

FIG. 3 is a schematic representation of a set $T_i$ of Video Object Units $VOBU_{i,j}$ generated with the method of the invention.

Figure 4:
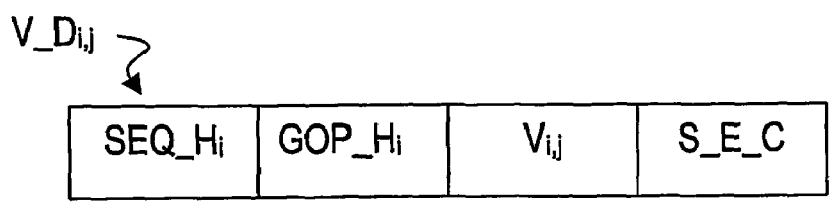
FIG. 4 is a schematic representation of the Video Data contained in a Video Object Unit of a set of Video Object Units as described with reference to FIG. 3.

FIG. 4 is a schematic representation of the Video Data $V\_D_{i,j}$ contained in a Video Object Unit $VOBU_{i,j}$. As represented in FIG. 4, the Video Data $V\_D_{i,j}$ comprises a Sequence Header $SEQ\_H_i$, a group of pictures (GOP) Header $GOP\_H_i$, an Intra-coded picture $V_{i,j}$, and a sequence_end_code S_E_C. The content of the $VOBU_{i,j}$ may occupy the payload of several Video Packs and Video Packets of the $VOBU_{i,j}$.

The display duration of the pictures depends directly on the number $N_i$ and on the length of the video gap in the Video Object Units $VOBU_{i,j}$. The number $N_i$ may either be a constant number or vary with the index i. The length of the video gap may either be constant or vary with the index i and/or j. Any combination of these parameters may be used. If one wants to obtain the lowest bitrate (that is the highest number of pictures on the disc), the maximum presentation period should be used for each Video Object Unit $VOBU_{i,j}$ (i.e. the largest video gap) and the number $N_i$ of Video Object Units should be set to the minimum.

The value of the number $N_i$ and the quantity of the video gap may either be preset or user selectable.

Optionally, the data structure generated with the method of the invention may comprise other types of material like video, audio, or subtitles. These materials are inserted in Video Pack(s), Audio Pack(s), and Sub-picture Pack(s), respectively. Depending on their nature, they are inserted in the same Video Object Units as the video pictures $V_{i,j}$ or in different Video Object Units.

The invention keeps the bitrate relatively low and the generation time relatively short. For example, if the presentation period of each Video Object Unit is set to 1 second and each Video Object Unit comprises one video picture of 200 kBytes (which corresponds to a High Quality encoding mode) the resulting bitrate will be 1.6 Mbit/s. With such a bitrate it is possible to record 6 hours on a DVD-Video compatible disc. To generate and record such a 6-hours slide show, 25 minutes would be required (the limitation comes from the writing speed on the disc, not from the generation process).

Figure 5:
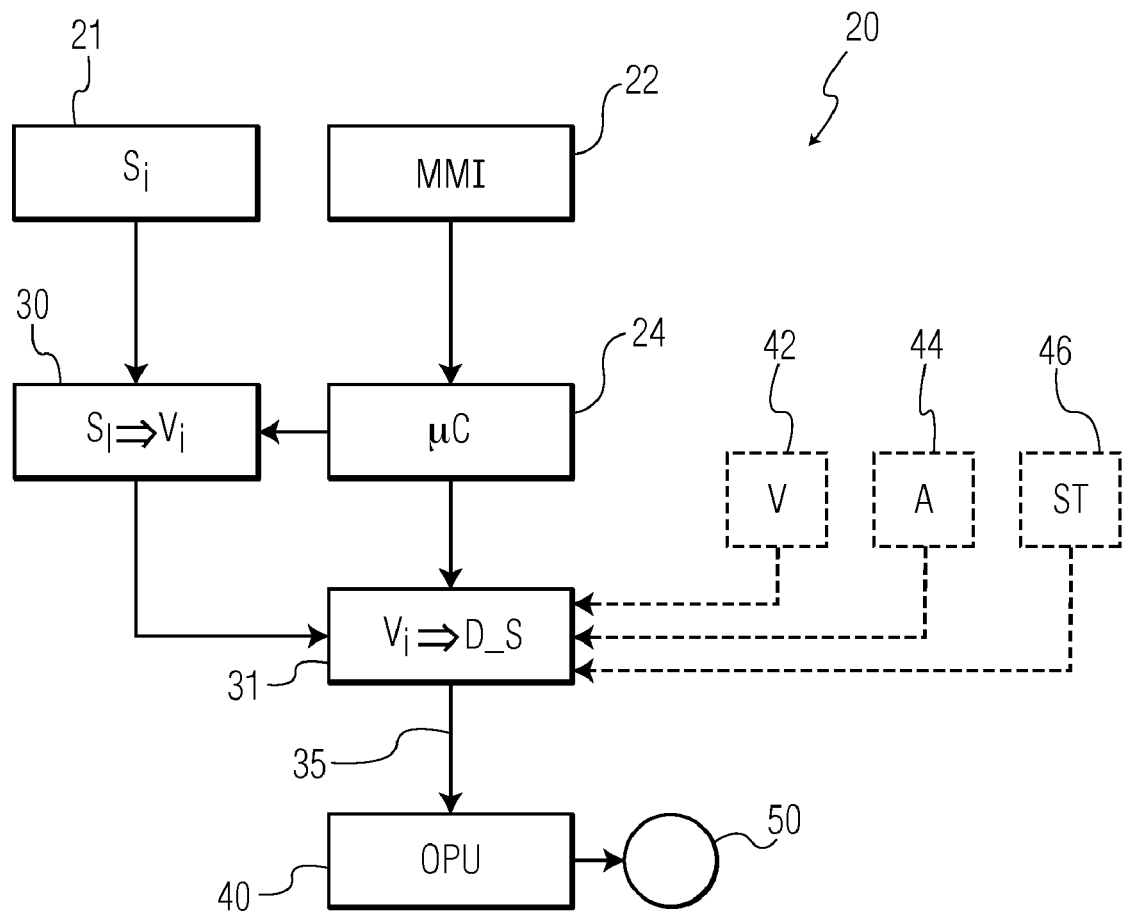
FIG. 5 is a schematic block diagram of an example of a device according to the invention for generating a DVD-Video compatible data structure from at least a plurality of still pictures, and recording said data structure.

FIG. 5 is a schematic representation of an example of a device 20 according to the invention. The device 20 is designed for generating a DVD-Video compatible data structure from at least a plurality of still pictures and for recording the generated data structure on any DVD-Video compatible disc (including a DVD+RW and DVD+R disc). As is shown in FIG. 5, the device 20 comprises:

a picture input 21 for receiving the still pictures, for instance an input for receiving a memory card storing still pictures and/or a USB port for connection with a digital camera containing such a memory card;

a user interface 22 for the user to make selections and activate functions;

a controller 24 for controlling the operations of device 20;

a picture processor 30 controlled by the controller 24 for processing said still pictures to generate video pictures having a DVD-Video compatible format;

a multiplexer 31 controlled by the controller 24 receiving at least the video pictures outputted by the image processor 30 (and optionally other types of material) and for generating a data structure 35 according to the invention and described above with reference to FIG. 1 to FIG. 4;

an optical unit 40 for recording the data structure 35 on a DVD-video compatible disc 50.

For example, the user interface 22 is designed to allow:

selection by the user of a slide show generation/recording function amongst a plurality of proposed functions;

selection by the user of the still pictures to be used to generate the slide show from among a plurality of still pictures that are available;

selection by the user of other material to be included in the data structure to be generated (like video, audio, subtitles);

specification by the user of the number $N_i$ and of the length of the video gap.

Optionally the device 20 comprises an video input 42, a audio input 44, and a subtitle input 46 to be used to provide said other types of material to be mixed with the video pictures generated by the image processor 30.

Although not represented in FIG. 5, the device 20 advantageously comprises conventional means for reading DVD-Video compatible discs.

The above-described elements of the device 20 are realized in hardware, software or in a combination of hardware and software. They may be arranged in a centralized fashion in one computer system or they may be distributed across several computer systems.

Typically the controller 24 is made of a general-purpose processor and a software comprising instructions that when loaded and executed by said general-purpose processor control the operation of the device 20. If the picture processor 30 and the multiplexer 31 are implemented in pure software, this software is executed by said general-purpose processor.

The disc 50 may be compliant with any compatible DVD-Video format including DVD+RW, DVD+R, DVD-RW, DVD-R . . . . It can be read by any DVD-Video compatible player.

With respect to the described method, device, program and medium, modifications or improvements may be proposed without departing from the scope of the invention. The invention is thus not limited to the examples provided.

In particular, although the device of FIG. 5 is a slide show recording device, the invention also covers a slide show generating device in which the optical unit 40 is omitted.

Use of the verb "comprise" and its conjugations does not exclude the presence of elements or steps other than those stated.

Use of the article "a" or "an" preceding an element or step does not exclude the presence of a plurality of such elements or steps.

The invention claimed is:

1. A device for generating a DVD-Video compatible data structure from at least a plurality of still pictures, said device comprising:

means for reading said still pictures;

means for processing said still pictures to generate video pictures having a DVD-Video compatible format, said video pictures comprising time stamps;

means for generating from each video picture a set of Video Object Units, wherein each Video Object Unit comprises said video picture with different time stamps and a video gap, wherein the means for generating generates the set of the Video Object Units by repeating a first Video Object Unit of the set and adapting the time stamps;

means for generating a DVD-Video compatible data structure comprising said sets of Video Object Units.

2. The device as claimed in claim 1, further comprising means for recording said DVD-Video compatible data structure on a recordable DVD-Video compatible medium.

3. The device as claimed in claim 1, wherein the number of video pictures in a set of video pictures is adaptable.

4. The device as claimed in claim 1, wherein the size of said video gap is adaptable.

5. A method of generating a DVD-Video compatible data structure from at least a plurality of still pictures, said method comprising the acts of:

reading said still pictures;

processing said still pictures to generate video pictures having a DVD-Video compatible format, said video pictures comprising time stamps;

generating from each video picture a set of Video Object Units wherein each Video Object Unit comprises said video picture with different time stamps and a video gap, wherein the generating act repeats a first Video Object Unit of the set and adapts the time stamps;

generating a DVD-Video compatible data structure comprising said sets of Video Object Units.

6. The method as claimed in claim 5, further comprising the act of recording said DVD-Video compatible data structure on a recordable or rewritable DVD-Video compatible medium.

7. The method as claimed in claim 5, wherein the number of video pictures in a set of video pictures is adaptable.

8. The method as claimed in claim 5, wherein the size of said video gap is adaptable.

9. A DVD-Video compatible medium carrying DVD-Video compatible data structure that comprises at least a plurality of sets of Video Object Units, wherein:

each Video Object Unit comprises a video picture followed by a video gap, said video pictures comprising time stamps;

the video pictures belonging to the same set of Video Object Units being identical except from their time stamps.

10. A computer readable medium embodying a computer program comprising instructions for implementing a method as claimed in claim 5 when executed by a processor.

11. The device of claim 1, wherein the time stamps include decoding time stamps which indicate a time for decoding the video picture, and a presentation time stamps which indicate a time for displaying the video picture.

12. The device of claim 1, wherein the video gap is created by setting a presentation period for the Video Object Unit that is longer than a presentation period of the video picture.

13. The method of claim 5, wherein the time stamps include decoding time stamps which indicate a time for decoding the video picture, and a presentation time stamps which indicate a time for displaying the video picture.

14. The method of claim 5, wherein the video gap is created by setting a presentation period for the Video Object Unit that is longer than a presentation period of the video picture.

15. The DVD-Video compatible medium of claim 9, wherein the time stamps include decoding time stamps which indicate a time for decoding the video picture, and a presentation time stamps which indicate a time for displaying the video picture.

16. The DVD-Video compatible medium of claim 9, wherein the video gap is created by setting a presentation period for the Video Object Unit that is longer than a presentation period of the video picture.

17. The DVD-Video compatible medium of claim 9, wherein the Video Object Units have different video gaps.

* * * * *